UNITED STATES PATENT OFFICE.

A. H. PERKINS, OF CHICAGO, ILLINOIS.

IMPROVED PROCESS FOR MANUFACTURING UNDERGROUND PIPES.

Specification forming part of Letters Patent No. 46,134, dated January 31, 1865; antedated January 6, 1865.

*To all whom it may concern:*

Be it known that I, A. H. PERKINS, of Chicago, in the county of Cook and State of Illinois, have invented a new and useful Improved Process for Manufacturing Pipe to be Laid Underground; and I do hereby declare that the following is a full, clear, and exact description of the same.

The nature of my invention consists in casting pipe of prepared pitch, either alone or in composition with mineral paint or its equivalent, to be used for all purposes where pipe is laid underground.

To enable those skilled in the art to manufacture and use my invention, I will proceed to describe it with particularity.

I take pitch, made either of resin or of coal or pine tar, and render it into a liquid state by any of the known processes, (for one of which I have a patent.) I use the pitch thus rendered either alone or mix with it some suitable material to give it body and make it cheaper. I commonly use for this purpose mineral paint, mixing it with the pitch in equal proportions of each kind. The material thus prepared may be cast in sand, substantially as iron is cast; but when it is cast in this way I usually put strips of wood into the mold, so that they will be cast partly in the wall of the pipe and partly on the outside of it, the object of the said strips of wood being to protect the pipe when being handled and shipped; but I commonly cast my pipe as follows: I take coarse, thick, fibrous paper or felt and roll it into cylindrical form of the size I wish to construct the pipe. I then make another roll of a smaller size—smaller by the thickness of the wall of the pipe. I then place the smaller cylinder within the larger one, arranging them concentrically. I then pour the prepared pitch or composition into the annular space formed between the two cylinders, when they become saturated and form a part of said pipe. The pipe then hardens and is ready for use.

My pipe is intended to be used for all purposes where pipe is laid underground, as for street-mains for gas or for water or sewage purposes. The pipe, either cast of pitch alone or of a composition of pitch and mineral paint, becomes very hard and durable. From the fact that it never corrodes it is more durable even than iron pipe, and as it is not subject to as much expansion and contraction from the effect of heat and cold, it is much less liable to get out of repair than iron pipe. These facts, together with the fact that the pipe can be manufactured much cheaper than any other pipe now in use, make my invention a very valuable one.

I am aware that pipes have been made heretofore by casting bituminous matters or compounds in molds.

Having thus fully described the construction and use of my invention, what I claim, and desire to secure by Letters Patent, is—

Manufacturing pipe by casting prepared pitch or other bituminous substances or compounds between two concentric tubes of heavy fibrous paper or felt, or its equivalent, substantially as and for the purposes herein set forth.

A. H. PERKINS.

Witnesses:
  W. E. MARRS,
  L. L. COBURN.